United States Patent
Baek et al.

(10) Patent No.: US 9,436,517 B2
(45) Date of Patent: Sep. 6, 2016

(54) RELIABILITY-AWARE APPLICATION SCHEDULING

(71) Applicant: Microsoft Corporation, Redmond, WA (US)

(72) Inventors: Woongki Baek, Daejeon (KR); Sriram Govindan, Redmond, WA (US); Sriram Sankar, Redmond, WA (US); Kushagra V. Vaid, Sammamish, WA (US); Badriddine Khessib, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 598 days.

(21) Appl. No.: 13/730,715

(22) Filed: Dec. 28, 2012

(65) Prior Publication Data

US 2014/0189706 A1    Jul. 3, 2014

(51) Int. Cl.
*G06F 9/46* (2006.01)
*G06F 9/50* (2006.01)

(52) U.S. Cl.
CPC ............ *G06F 9/5094* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 6,681,367 B1 * | 1/2004 | Griwodz et al. | 715/234 |
| 7,805,517 B2 | 9/2010 | Shim et al. | |
| 7,877,644 B2 | 1/2011 | Stenzel | |
| 2007/0266387 A1 * | 11/2007 | Henmi | 718/102 |
| 2009/0259737 A1 * | 10/2009 | Aikoh et al. | 709/221 |
| 2011/0246987 A1 * | 10/2011 | Diwakar et al. | 718/1 |
| 2013/0138461 A1 * | 5/2013 | Shahraray et al. | 705/7.12 |

OTHER PUBLICATIONS

Vishwanath, et al., "Characterizing Cloud Computing Hardware Reliability", Retrieved at <<http://research.microsoft.com/pubs/120439/socc088-vishwanath.pdf>>, Proceedings of the 1st ACM symposium on Cloud computing, Jun. 10, 2010, pp. 11.

Rood, et al., "Scheduling on the Grid via Multi-State Resource Availability Prediction", Retrieved at <<http://ieeexplore.ieee.org/stamp/stamp.jsp?tp=&arnumber=4662791>>, 9th IEEE/ACM International Conference, Oct. 1, 2008, pp. 10.

(Continued)

*Primary Examiner* — Wissam Rashid
(74) *Attorney, Agent, or Firm* — Henry Gabryjelski; Kate Drakos; Micky Minhas (57) ABSTRACT

Reliability-aware scheduling of processing jobs on one or more processing entities is based on reliability scores assigned to processing entities and minimum acceptable reliability scores of processing jobs. The reliability scores of processing entities are based on independently derived statistical reliability models as applied to reliability data already available from modern computing hardware. Reliability scores of processing entities are continually updated based upon real-time reliability data, as well as prior reliability scores, which are weighted in accordance with the statistical reliability models being utilized. Individual processing jobs specify reliability requirements from which the minimum acceptable reliability score is determined. Such jobs are scheduled on processing entities whose reliability score is greater than or equal to the minimum acceptable reliability score for such jobs. Already scheduled jobs can be rescheduled on other processing entities if reliability scores change. Additionally, a hierarchical scheduling approach can be utilized.

20 Claims, 3 Drawing Sheets

(56) References Cited

OTHER PUBLICATIONS

"Capacity management and sizing overview for SharePoint Server 2013", Retrieved at <<http://technet.microsoft.com/en-us/library/ft758647(v=office.15).aspx, Jul. 24, 2012, pp. 9.

Hussain, Sadequl., "Windows Reliability and Performance Monitor to troubleshoot SQL Server", Retrieved at <<http://www.mssqltips.com/sqlservertip/1890/windows-reliability-and-performance-monitor-to-troubleshoot-sql-server/>>, Retrieved Date: Oct. 1, 2012, pp. 14.

"Introduction to Microsoft Windows server 2008", Retrieved at <<http://wins2k8.blogspot.in/2009/09/introduction-to-microsoft-windows.html>>, Sep. 10, 2009, pp. 14.

"Understanding High Availability for the BlackBerry Enterprise Server", Retrieved at <<http://us.blackberry.com/content/dam/blackBerry/pdf/whitePaper/northAmerica/english/RIM1270_UnderstandingHighAvailability-LowRes.pdf>>, Retrieved Date: Oct. 1, 2012, pp. 12.

Milanovic, Dr.-Ing. Nikola., "Models, Methods and Tools for Availability Assessment of IT-Services and Business Processes", Retrieved at <<http://opus.kobv.de/tuberlin/volltexte/2010/2678/pdf/milanovic_nikola.pdf>>, May 2010, pp. 282.

\* cited by examiner

RELIABILITY-AWARE APPLICATION SCHEDULING

BACKGROUND

Collections of powerful, multi-processor computing devices, typically organized into professionally managed data centers, can make available their processing capabilities to purchasers, thereby facilitating the performance of tasks that could not efficiently be performed otherwise. The more processing that can be accommodated by such a collection of computing devices, the more value can be realized therefrom. Consequently, it is desirable to utilize as much of the data processing capability of a collection of computing devices as possible without negatively impacting those purchasers of such processing capabilities, who seek to utilize such collection of computing devices to perform data processing.

To maximize the utilization of collections of computing devices, such as in a data center context, schedulers typically schedule processing to be performed, typically in the form of discrete applications or processes to be executed or tasks to be performed, on one or more such computing devices. For ease of reference, and in accordance with the terminology used by those of skill in the art, the term "processing jobs", or, more simply, "jobs", will be utilized herein to refer to discrete processing tasks that can be individually and independently scheduled and executed. Processing schedulers seek to ensure that processing capabilities of computing devices do not remain unused so long as processing jobs remain to be scheduled. In scheduling processing jobs, processing schedulers typically take into account factors directed to the priority of the job, such as whether a job can be delayed or must be executed instantaneously, or whether a job must be continuously available, or is sufficiently robust to withstand downtime. Processing schedulers can also take into account the location of data that may be processed, or otherwise consumed by, a job, to avoid inefficiencies associated with the copying of large volumes of data.

Unfortunately, even professionally maintained and robustly designed computing devices experience failures that negatively impact their ability to perform processing. For example, hard disk drives that utilize spinning magnetic media can fail due to damage to the media itself, or damage due to the mechanical mechanisms that facilitate the reading of data from such media or the writing of data to such media. As another example, solid state storage media can become unusable due to electrical failures that can negatively impact the ability of such solid-state storage media to retain, and recall, digital data. Other aspects and components of computing devices can, likewise, experience failures. Typically, however, failures are only dealt with reactively, such as, for example, by maintaining redundancy such that the data and processing lost due to such failures are minimized. From a scheduling perspective, therefore, jobs are scheduled as if the computing devices will never fail, with the damage from the failures which, inevitably, occur simply being minimized by the above referenced redundancies.

SUMMARY

In one embodiment, a scheduler can be reliability-aware and can take into account predicted reliabilities in scheduling processing jobs to be executed by one or more processing entities, such as computing devices, individual processing units, or collections of computing devices such as a rack of server computing devices, or a data center itself. Thus, processing jobs having a lower tolerance for failure can be scheduled on processing entities having a higher reliability, while processing jobs that can accommodate a higher rate of failure can be scheduled on processing entities having a lower reliability.

In yet another embodiment, a reliability score, or other like quantification of reliability, can be assigned to individual processing entities. An analogous minimum acceptable reliability score can be associated with individual processing jobs, quantifying such jobs' reliability requirements. The reliability-aware scheduler can schedule processing jobs on processing entities whose reliability score is greater than or equal to the minimum acceptable reliability score for those processing jobs.

In a further embodiment, independently derived statistical reliability models can be utilized in conjunction with both historical reliability data and real-time reliability data to generate reliability scores for individual processing entities. Depending upon the statistical reliability models, the historical reliability data can be in the form of previously derived reliability scores, which can be weighted in accordance with the statistical reliability models in determining a current reliability score.

In a still further embodiment, a reliability interface can receive reliability data, in a standardized manner, from a myriad of different computing devices, mechanisms and functionality. Such reliability data can include empirical data already being collected by sensors or monitors present on modern computing hardware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the reliability-aware scheduling of processing jobs on one or more processing entities. Independently derived statistical reliability models can be utilized in conjunction with reliability data already available from sensors and monitors present on modern computing hardware to quantify the reliability of such hardware in the form of a reliability score. Individual processing jobs can specify reliability requirements, or can provide other job-related information, from which a minimum acceptable reliability score for such jobs can be determined. Such jobs can then be scheduled on processing entities whose reliability score is greater than or equal to the minimum acceptable reliability score for such jobs. Reliability scores of processing entities can be continually updated based upon real-time reliability data, as well as prior reliability scores, which can be weighted in accordance with the statistical reliability models being utilized. Already scheduled jobs can be rescheduled on other processing entities if reliability scores sufficiently change. Factors, such as job priority, job starvation, and other like traditional scheduling factors, can likewise be taken into account. Additionally, a hierarchical scheduling approach can be utilized, where reliability scores are assigned to collections of computing devices, individual computing devices themselves, and specific components or processors of computing devices.

The techniques described herein make reference to reliability-aware scheduling, and the mechanisms described below illustrate exemplary embodiments within which the scheduling of processing jobs on processing entities is performed in accordance with reliability factors. As will be recognized by those skilled in the art, however, such reliability factors are not exclusive, and schedulers can equally consider and weight other factors, including traditional scheduling factors such as availability, priority, convenience, and other like factors. Consequently, while the descriptions below focus on the single dimension of reliability for ease of reference and description, factors in other dimensions can be considered and weighted, and the descriptions below are intended to be encompassing of, as opposed to excluding, such additional dimensions and factors.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
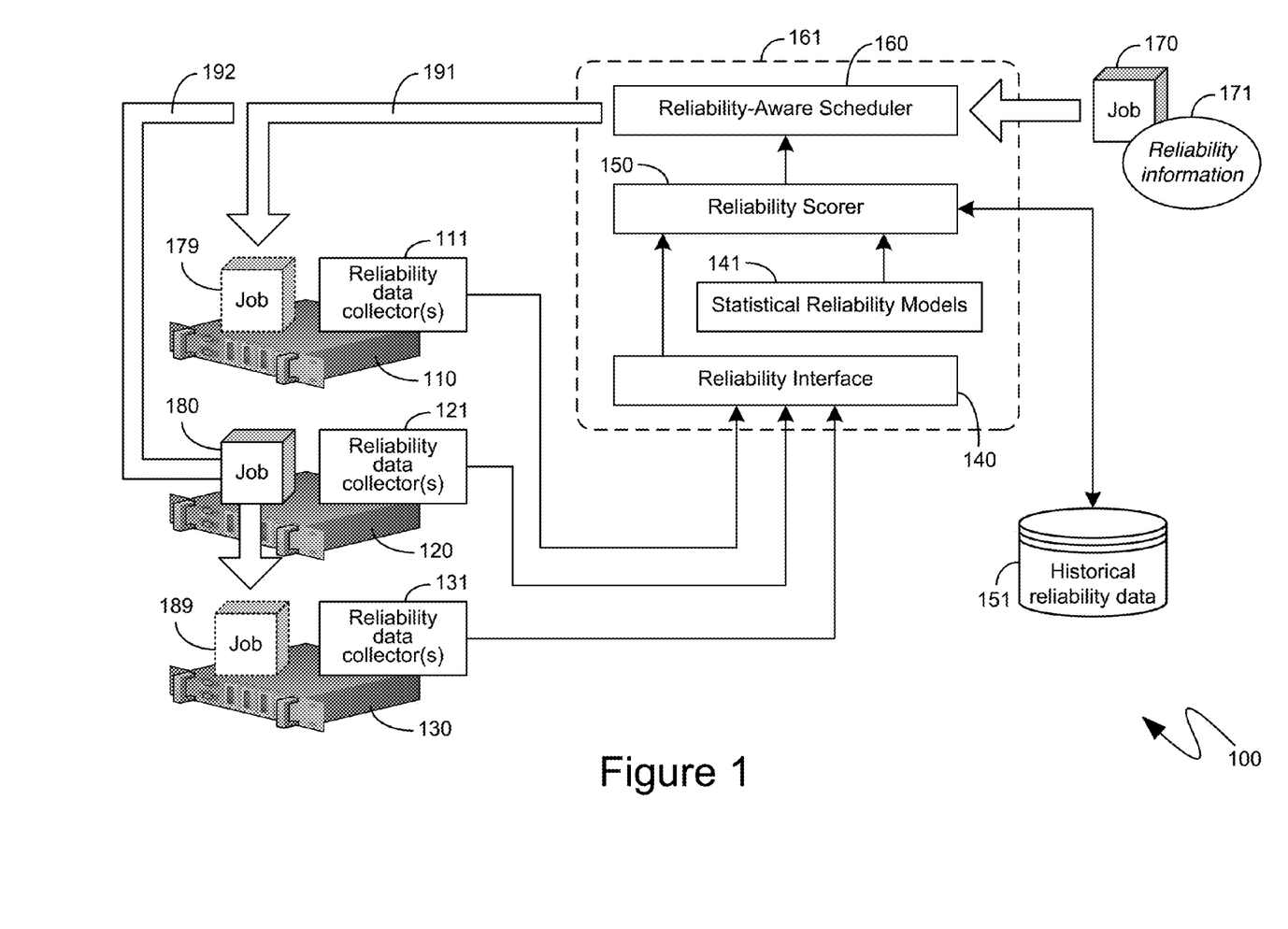
FIG. 1 is a block diagram of an exemplary scheduling of processing jobs on computing devices.

With reference to FIG. 1, an exemplary system 100 is illustrated in which processing jobs, such as the exemplary job 170, can be scheduled on one or more processing entities, which, in the exemplary system 100 of FIG. 1, are illustrated as the server computing devices 110, 120 and 130. Each of the server computing devices 110, 120 and 130 can comprise reliability data collectors, such as the exemplary reliability data collectors 111, 121 and 131, respectively. The reliability data collectors can collect data that can be indicative of the reliability of the server computing devices, or components thereof. In one embodiment, the reliability data collectors can comprise sensors, monitors and other like mechanisms that can already be present on modern computing devices. For example, reliability data collectors can include the sensors, monitors and mechanisms that provide S.M.A.R.T. information from modern hard disk drives. As another example, reliability data collectors can include temperature sensors, including temperature sensors that are built into existing hardware, such as central processing units, and standalone temperature sensors. As yet another example, reliability data collectors can include low-level status registers or other like mechanisms that can be integrated into one or more processing units of a computing device and which can store binary data that can be indicative of specific errors, measurements, or other like reliability data.

In another embodiment, the reliability data collectors can comprise sensors, monitors and other like mechanisms that are specifically designed to collect data that has been found to be indicative of reliability, but which may not otherwise have been collected. For example, if independently derived statistical reliability models, such as will be described in further detail below, indicated that computing devices operating under high atmospheric pressure were more likely to fail than computing devices operating under low atmospheric pressure, atmospheric pressure sensors could be provided and act as reliability data collectors.

The reliability data collectors, such as the exemplary reliability data collectors 111, 121 and 131 can, in one embodiment, provide the data collected by such data collectors to a reliability interface 140, which can provide a standardized interface through which different types of data collectors can provide reliability data. For example, as will be recognized by those skilled in the art, the server computing devices 110, 120 and 130 can be manufactured by different manufacturing entities, and can utilize differently sourced components. As such, different protocols and formats of communications and data may be utilized by such components in providing the reliability data, such as that exemplarily enumerated above. Thus, in one embodiment, the reliability interface 140 can provide a standardized interface through which such reliability data can be provided. For example, other processes, such as those that will be described in further detail below, can request or access, specific ones of the reliability data collected by reliability data collectors through the reliability interface 140. In such a manner, such other processes need not be provided with detailed knowledge regarding the obtaining of such data, which, as will be recognized by those skilled in the art, can be specific and esoteric. In another embodiment, the reliability interface 140 can accept the reliability data in native form and then translate it into a standardized, or normalized form, such that such reliability data can be consumed by the reliability scorer 150 to generate one or more reliability scores, such as for the server computing devices 110, 120 and 130.

The reliability scorer 150 can utilize the reliability data collected by reliability data collectors, such as the reliability data collectors 111, 121 and 131, to generate a reliability score for a processing entity. As utilized herein, the term "processing entity" means any defined collection of one or more processing units. Thus, for example, an entire data center is one type of processing entity, a rack of server computing devices is another type of processing entity, individual computing devices themselves are another type of processing entity and each individual processing chip or other like processing circuitry is a another type of processing entity. Thus, the reliability scorer 150 can generate reliability scores for a data center as a whole, for a collection of computing devices such as, for example, a rack of server computing devices, for individual computing devices, and even for individual processing units within a single computing device. In generating such reliability scores, the reliability scorer 150 can utilize the reliability interface 140 to obtain reliability data appropriate for the processing entity for which the reliability scorer is generating a reliability score. For example, if the reliability scorer 150 is generating a reliability score for a collection of computing devices, such as a rack of server computing devices, then the reliability scorer 150 can base such a score upon reliability data that is applicable to all of the computing devices in such a collection, such as, for example, temperature reliability data. By contrast, and as another example, if the reliability scorer 150 is generating a reliability score for a single processing component of a computing device, then the reliability scorer 150 can base such a score upon reliability data relevance to that single processing component, such as, for example, memory error information stored in one or more of the status registers of such a processor.

In one embodiment, the reliability data upon which a reliability scorer, such as the reliability scorer 150, bases its determination of a reliability score can be independently derived statistical reliability models, such as the exemplary statistical reliability models 141. In particular, and as will be recognized by those skilled in the art, there exists research attempting to correlate various factors of computing devices, their operation, or their environment to failures of such computing devices. For example, a statistical reliability model can establish a correlation between the corrected memory error rate of a computing device and the probability of a failure of such a computing device due to uncorrected memory errors. In such an example, the reliability scorer 150 can obtain, from the reliability interface 140, reliability data collected by reliability data collectors indicating the corrected memory error rate of, for example, a computing device. The reliability scorer 150 can then generate a reliability score based upon the correlation between the corrected memory error rate and the probability of failure that was determined by that statistical reliability model. As another example, a statistical reliability model can establish a correlation between the air temperature entering a computing device, such as for cooling purposes, and the probability of a failure of one or more hard disk drives of such a computing device. In such an example, the reliability scorer 150 can obtain reliability data indicating the temperature of the air being drawn into a computing device. The reliability scorer 150 can then generate a reliability score based upon the correlation between such an air temperature and the probability of failure that was determined by that statistical reliability model.

Other examples of statistical reliability models includes statistical reliability models establishing a correlation between nonfatal memory errors and the probability of failure due to fatal memory errors, and statistical reliability models establishing a correlation between storage device Input/Output (I/O) and the probability of failure due to the failure of one or more storage devices. Additionally, although illustratively explained within the context of simple one-to-one correlations, the mechanisms described are not so limited. In particular, statistical reliability models, such as the statistical reliability models 141, can correlate multiple different factors, with different weightings, to the probability of failure. Similarly, the reliability scorer 150 can generate reliability scores that can represent an amalgamation of discrete reliability models. For example, returning to the above examples of statistical reliability models establishing correlations between the corrected memory error rate and the probability of failure, and between the input air temperature and the probability of failure, a reliability scorer, such as the reliability scorer 150, can generate a single reliability score based upon reliability data that includes both the corrected memory error rate and the input air temperature. Other, more complex, interactions between multiple statistical reliability models can also be taken into account by the reliability scorer 150 in generating a reliability score for one or more processing entities.

In one embodiment, the reliability score assigned to a processing entity can be based on a prior reliability score, appropriately weighted, plus a function of real-time reliability data that can be based on one or more statistical reliability models. As one example, simplified for the sake of illustration and description, a statistical reliability model can indicate that the probability of failure increases by 1% for each minute that a computing device is operated in an area where the ambient temperature is higher than 120° F. In such an example, a reliability score of a computing device, as determined by the reliability scorer 150, can be, for example, one hundred so long as the computing device is operated in an area where the ambient temperature is lower than 120° F. If the ambient temperature were to rise above 120° F., the current reliability score can be determined based on the prior reliability score, namely one hundred, which can be weighted with a weighting of substantially less than one to account for the fact that reliability changes quickly when the computing device is operated at high ambient temperatures. The current reliability score can also be based on a function correlating the ambient temperature and the probability of failure which, in the present example, can be a function that, when the input of such a function, namely the ambient temperature, is above 120° F., the output of such a function causes the reliability score to decrease at a sufficient rate. As can be seen, therefore, the weighting applied to a prior reliability score can be dependent upon the temporal impact of the reliability data, as identified by the statistical reliability models. Similarly, as can also be seen, the function applied to the reliability data can be based on the statistical reliability models in order to output a reliability score in accordance with those models.

The weighting applied to the prior reliability score, as well as the function applied to the reliability data, can be static or can change dynamically. More particularly, historical reliability data 151 can be maintained by storing and retaining the reliability data collected by, for example, the reliability data collectors 111, 121 and 131, which, as indicated previously, can be monitors, sensors, and other like components and mechanisms of existing computing devices that can have been in operation for an extended period of time during which their data can have been collected and retained. Such historical reliability data 151 can be mined to calibrate the mathematical functions applied to the real-time reliability data, and the weighting functions applied to the prior reliability scores, which can be utilized by the reliability scorer 150, such as in the manner described in detail above, to generate a current reliability score for a processing entity. In one embodiment, such a calibration can result in a determination that the weighting applied to the prior reliability score can vary, depending on other factors. Alternatively, such a calibration can be performed periodically and the weighting applied to the prior reliability score can be periodically updated accordingly. Like changes can also be made to the function applied to the reliability data.

A reliability score for a processing entity can enable a scheduler, such as the reliability-aware scheduler 160, to schedule jobs taking into account reliability information. More specifically, a job, such as the exemplary job 170, can have reliability information, such as the exemplary reliability information 171, associated with it. One type of reliability information can be explicit reliability information presented in a format directly consumable by the reliability-aware scheduler 160. For example, a job could directly specify a minimum acceptable reliability score that a processing entity should be associated with in order for such a job to be assigned to such a processing entity. Another type of reliability information can be implicit reliability information, such as job requirements, specifications, purposes, or other like job-related information. For example, a job could specify that it provides a service that needs to be continuously available. As another example, a job could specify that it requires only intermittent processing, or that it is fault tolerant.

The reliability-aware scheduler 160 can, in one embodiment, determine a minimum threshold reliability score for a job based on specified job requirements or other like indirect reliability information 171. For example, a job specifying that it is fault tolerant can be assigned a lower minimum threshold reliability score than a job that requires continuous uptime. Similarly, as another example, a job specifying that is performing opportunistic processing can be assigned a lower minimum threshold reliability score than a job specifying continuous processing.

Reliability-aware scheduler 160 can schedule jobs, such as the job 170, based upon the minimum threshold reliability score associated with such a job and the reliability scores of one or more processing entities, as assigned by the reliability scorer 150. In one embodiment, a job, such as the job 170, can be scheduled, such as by the reliability-aware scheduler 160, on any processing entity, or combinations thereof, having reliability scores greater than or equal to the minimum threshold reliability score of the job. Thus, for example, in the exemplary system 100 shown in FIG. 1, the job 170 can have a minimum threshold reliability score that is lower than the reliability score of, for example, the computing device 110. Consequently, the reliability-aware scheduler 160 can schedule the job 170 to execute on the computing device 110, as the job 179, as illustrated by the action 191.

In one embodiment, the reliability scores of processing entities, and the minimum threshold reliability scores of jobs, can simply enable the reliability-aware scheduler 160 to filter out certain processing entities as being inappropriate for specific jobs, since the reliability scores of those processing entities, as assigned by the reliability scorer 150, can be lower than the minimum threshold reliability scores of those specific jobs. The reliability-aware scheduler 160 can then select from among the remaining processing entities to select one or more processing entities on which the job is to be scheduled. For example, if the reliability scores of multiple processing entities were greater than or equal to the minimum threshold reliability score of a specific job, the reliability-aware scheduler 160 could schedule such a job on multiple processing entities to provide for redundancy. More specifically, and as indicated previously, reliability can be only a single factor from among multiple factors that can be considered by the reliability-aware scheduler 160 in selecting one or more processing entities on which to schedule jobs. Thus, in one embodiment, reliability can be a threshold factor, wherein the reliability-aware scheduler 160 first identifies those processing entities whose reliability scores are greater than, or at least equal to, the minimum threshold of reliability score specified by, or associated with, a specific job. Subsequently, from among the processing entities that were identified, the reliability-aware scheduler 160 can select processing entities on which the job will be scheduled based upon other factors in a more traditional manner. In another embodiment, reliability factors can be taken into account together with other factors and an overall optimal decision can be made by the reliability-aware scheduler 160.

As indicated previously, a processing entity can comprise a single processing unit in a computing device, a single computing device, or a defined collection of computing devices. Analogously, both the reliability scorer 150 and the reliability-aware scheduler 160 can operate in a hierarchical manner. For example, one reliability-aware scheduler can select, from among collections of computing devices, such as racks of server computing devices in a data center, those one or more collections of computing devices whose reliability scores are greater than or equal to a minimum threshold reliability score of a job to be scheduled. Once that reliability-aware scheduler schedules such a job on a specific collection of computing devices, another reliability-aware scheduler, which can be specific to that collection of computing devices, can then select from individual ones of those computing devices to schedule the job on a specific one of those individual computing devices. More specifically, such a reliability-aware scheduler can compare the reliability scores of the individual computing devices and can select at least one individual computing device whose reliability score is greater than or equal to the minimum threshold reliability score of the job being scheduled. In such a hierarchical manner, a job can ultimately be scheduled on one or more processing units, or other like most basic processing entity.

In addition to scheduling jobs on one or more processing entities, the reliability-aware scheduler 160 can also move jobs from one processing entity to another. More specifically, and as indicated previously, the reliability scorer 150 can receive real-time reliability data through the reliability interface 140. Such real-time reliability data can result in real-time updates to the reliability scores of one or more processing entities, as assigned by the reliability scorer 150. Consequently, a processing entity's reliability score can change so as to be below the minimum threshold reliability score of a job that was scheduled to execute, and is executing, on such a processing entity. In such an instance, in one embodiment, the reliability-aware scheduler 160 can reschedule, or move, the job to another processing entity, namely one having a reliability score that is greater than or equal to the minimum threshold reliability score of the job. For example, and with reference to exemplary system 100 shown in FIG. 1, the job 180 can be executing on the computing device 120. Subsequently, one or more reliability data collectors, such as the reliability data collectors 121, can provide reliability data, such as via the reliability interface 140, which can cause the reliability scorer 150 to lower its reliability score for the computing device 120. The new reliability score for the computing device 120 can be less than the minimum threshold reliability score of the job 180. In such an example, the reliability-aware scheduler 160 can reschedule the job 180 from the computing device 120 and schedule it, as the job 189, on another computing device, such as the computing device 130, whose reliability score can be greater than or equal to the minimum threshold reliability score of the job 180. Such a rescheduling, or moving, action is illustrated by the action 192 shown in FIG. 1.

The reliability-aware scheduling system 161, comprising the reliability interface 140, the statistical reliability models 141, the reliability scorer 150 and the reliability-aware scheduler 160, can be executed by one or more computing devices including, for example, the computing devices on which jobs can be scheduled such as, for example, the computing devices 110, 120 and 130. It can also be executed across computing devices, or executed on computing devices separate and independent from the computing devices on which jobs can be scheduled such as, the computing devices 110, 120 and 130. For example, the reliability-aware scheduling system 161 can provide centralized scheduling of jobs across multiple computing devices. Similarly, the reliability-aware scheduling system 161 can executed on dedicated processing hardware, including customized hardware provided specifically for job scheduling.

Figure 2:
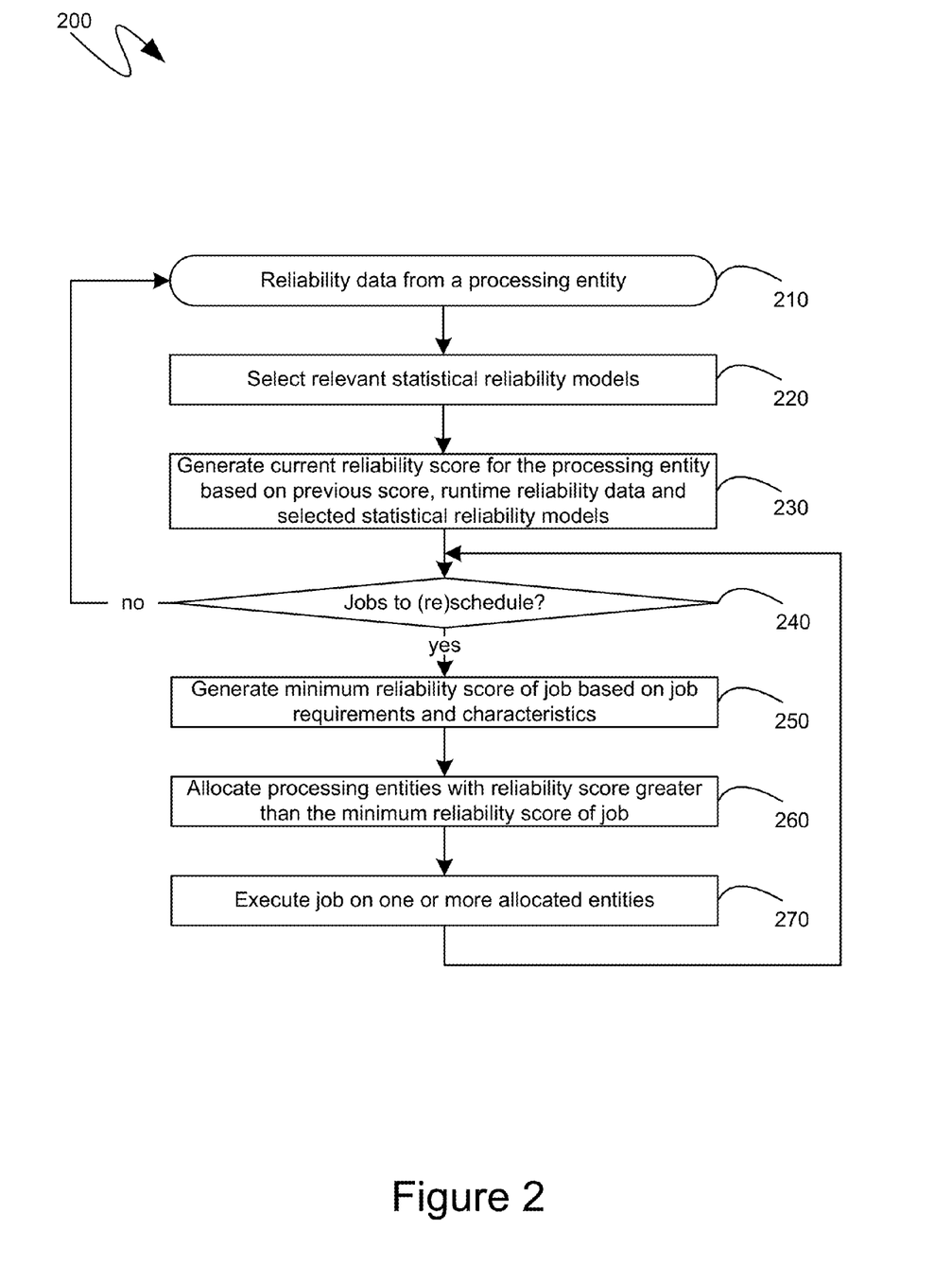
FIG. 2 is a flow diagram of an exemplary reliability-aware scheduling.

Turning to FIG. 2, an exemplary set of steps that can be performed by a reliability-aware scheduling system, such as that described in detail above, are illustrated by the exemplary flow diagram 200 shown therein. Reliability data from a processing entity, such as that described in detail above, can be received at step 210. Statistical reliability models can be selected at step 220 based upon the reliability data received at step 210. In an alternative embodiment, the statistical reliability models can be selected first, and the reliability data relevant to those models can be specifically requested or obtained.

Subsequently, at step 230, a current reliability score for the processing entity from which the reliability data was received at step 210 can be generated. As indicated previously, a current reliability score can be based on a prior reliability score, which can have a weighting applied to it in accordance with a decay, or other like mechanism with which the relevancy of the prior reliability score loses significance over time. Additionally, as also indicated previously, a current reliability score can be based on a function whose inputs are the reliability data received at step 210. Such a function can be empirically derived from the selected statistical reliability models of step 220, such as, for example, by mining existing historical reliability data utilizing the correlations identified by those statistical reliability models.

At step 240, if one or more jobs are to be scheduled, processing can proceed to step 250. Similarly, if one or more jobs are to be rescheduled, such as, for example, if the current reliability score, determined at step 230, changed sufficiently from a prior reliability score such that a job is executing on a processing entity that now has a lower reliability score than a minimum acceptable reliability score for such a job. Alternatively, if no jobs currently require scheduling, or rescheduling due to changes and the reliability score determined at step 230, processing can return to step 210.

A minimum acceptable reliability score for a job can be optionally generated at step 250 if, for example, the job did not already explicitly specify a minimum acceptable reliability score. For example, if a job only provided a specification of its requirements, then such requirements can be utilized to generate a minimum acceptable reliability score, at step 250, such as in the manner described in detail above. Once such a minimum acceptable reliability score of a job can be determined at step 250, and a determination can be made, at step 260, to identify those processing entities whose reliability scores are greater than the minimum acceptable reliability score of the job. The processing entities identified at step 260, therefore, can be considered to have at least as high a reliability as that required by the job. Processing can then proceed to step 270 where the job can be scheduled to be executed on one or more of those processing entities. For example, and as indicated previously, at step 270, other factors can be taken into account in selecting the one or more processing entities on which such jobs are to be scheduled. Processing can then return the step 240 or, optionally, to step 210. In such a manner, job scheduling can take into account the reliability of the processing entities on which such jobs are scheduled.

Figure 3:
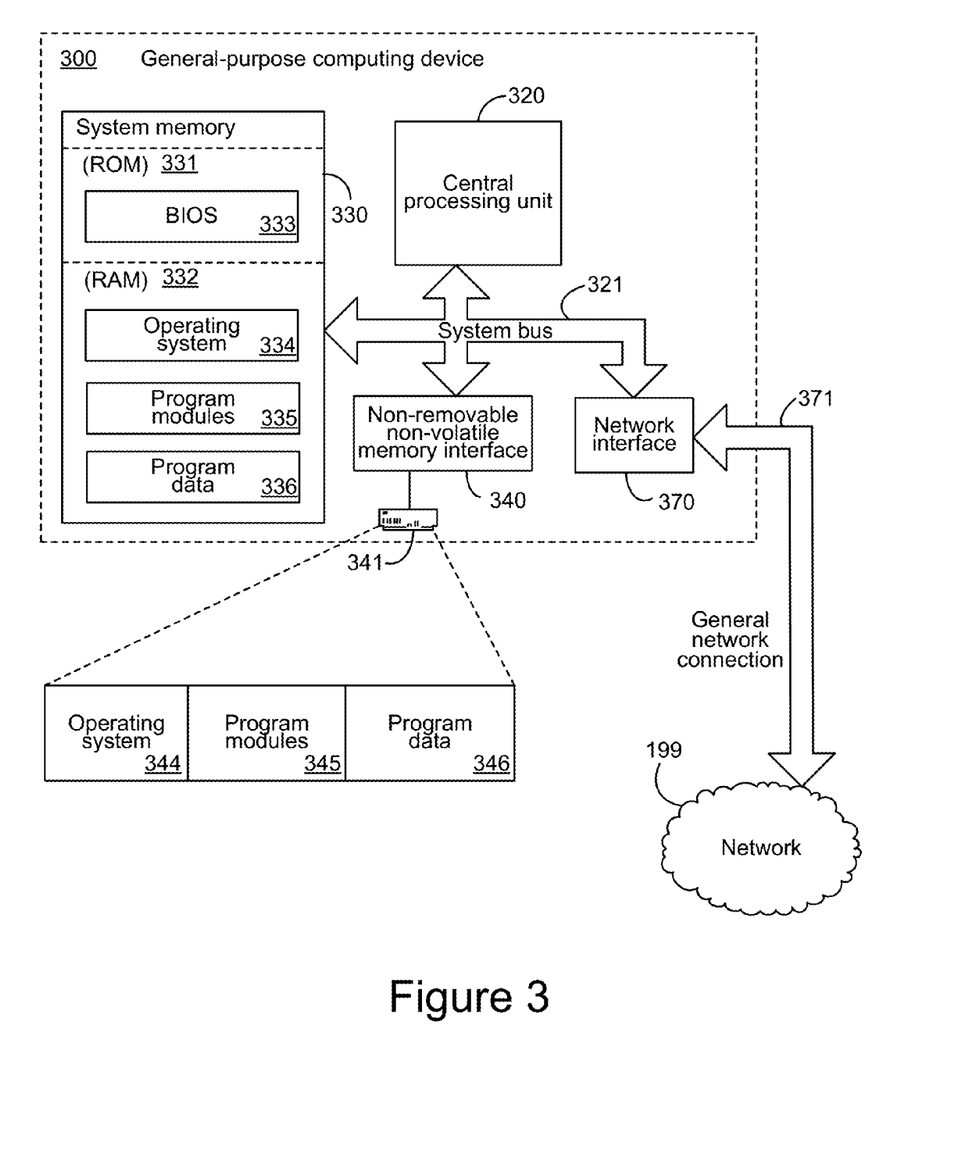
FIG. 3 is a block diagram illustrating an exemplary general purpose computing device.

Turning to FIG. 3, an exemplary general-purpose computing device, such as one of the one or more computing devices that can perform the steps of the flow diagram of FIG. 2, or one of the computing devices of FIG. 1 that can host and execute processing jobs, is illustrated in the form of the exemplary general-purpose computing device 300. The exemplary general-purpose computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the general-purpose computing device 300 can be physically co-located, such as on a single chip. In such a case, some or all of the system bus 321 can be nothing more than communicational pathways within a single chip structure and its illustration in FIG. 3 can be nothing more than notational convenience for the purpose of illustration.

The general-purpose computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 300. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

When using communication media, the general-purpose computing device 300 may operate in a networked environment via logical connections to one or more remote computers. The logical connection depicted in FIG. 3 is a general network connection 371 to the network 199, which can be a local area network (LAN), a wide area network (WAN) such as the Internet, or other networks. The computing device 300 is connected to the general network connection 371 through a network interface or adapter 370 that is, in turn, connected to the system bus 321. In a networked environment, program modules depicted relative to the general-purpose computing device 300, or portions or peripherals thereof, may be stored in the memory of one or more other computing devices that are communicatively coupled to the general-purpose computing device 300 through the general network connection 371. It will be appreciated that the network connections shown are exemplary and other means of establishing a communications link between computing devices may be used.

The general-purpose computing device 300 may also include other removable/non-removable, volatile/nonvolatile computer storage media. By way of example only, FIG. 3 illustrates a hard disk drive 341 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the general-purpose computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers here to illustrate that, at a minimum, they are different copies.

As can be seen from the above descriptions, a reliability-aware scheduling of processing jobs has been presented. Which, in view of the many possible variations of the subject matter described herein, we claim as our invention all such embodiments as may come within the scope of the following claims and equivalents thereto.

We claim:

1. A method of scheduling processing jobs on processing entities, the method comprising the steps of:
   receiving real-time reliability data associated with a processing entity;
   identifying a statistical reliability model that correlates processing entity failures to factors quantified by the received real-time reliability data;
   generating, with the identified statistical reliability model, a predicted future reliability of the processing entity based on at least some of the received real-time reliability data;
   generating a reliability score for the processing entity based on both the predicted future reliability of the processing entity and a prior reliability score for the processing entity;
   receiving a processing job for scheduling, the processing job having associated with it a minimum acceptable reliability score; and
   scheduling the received processing job on the processing entity only if the generated reliability score is greater than or equal to the minimum acceptable reliability score associated with the processing job.

2. The method of claim 1, wherein the reliability data comprises temperature information from temperature sensors.

3. The method of claim 1, wherein the reliability data comprises data from processor status registers.

4. The method of claim 1, wherein the processing entity is a collection of computing devices.

5. The method of claim 1, wherein the statistical reliability model is calibrated utilizing historical reliability data.

6. The method of claim 1, wherein the step of generating the reliability score comprises generating the reliability score based on the prior reliability score for the processing entity as weighted by a mathematical weighting indicating a decrease in relevance of the prior reliability score over time.

7. The method of claim 1, wherein the processing job explicitly specifies the minimum acceptable reliability score associated with it.

8. The method of claim 1, wherein the processing job specifies requirements of the processing job; the method further comprising the steps of: deriving the minimum acceptable reliability score associated with the processing job based on the specified requirements of the processing job.

9. The method of claim 1, further comprising the steps of:
   receiving updated reliability data associated with the processing entity;
   generating an updated reliability score for the processing entity based at least in part on the received updated reliability data;
   determining that a processing job previously scheduled on the processing entity, and still executing on the processing entity, is associated with a minimum acceptable reliability score that is higher than the updated reliability score of the processing entity; and
   rescheduling the processing job previously scheduled on the processing entity to a different processing entity, the different processing entity having a reliability score greater than or equal to the minimum acceptable reliability score associated with the job previously scheduled on the processing entity, the rescheduling resulting in execution of the processing job being moved from the processing entity to the different processing entity.

10. The method of claim 1, wherein the processing entity is a collection of individual computing devices, each individual computing device also having a reliability score; and wherein further the scheduling the received processing job on the processing entity comprises further scheduling the received processing job on a specific one of the individual computing devices based on its reliability score.

11. One or more computer-readable storage media comprising computer-executable instructions for scheduling processing jobs on processing entities, the computer-executable instructions, when executed by one or more processing units of a computing device, cause the computing device to perform steps comprising:

receiving real-time reliability data associated with a processing entity;

identifying a statistical reliability model that correlates processing, entity failures to factors quantified by the received real-time reliability data;

generating, with the identified statistical reliability model, a predicted future reliability of the processing entity based on at least some of the received real-time reliability data;

generating a reliability score for the processing entity based on both the predicted future reliability of the processing entity and a prior reliability score for the processing entity;

receiving a processing job for scheduling, the processing job having associated with it a minimum acceptable reliability score; and scheduling the received processing job on the processing entity only if the generated reliability score is greater than or equal to the minimum acceptable reliability score associated with the processing job.

12. The computer-readable storage media of claim 11, wherein the computer-executable instructions for generating the reliability score comprise computer-executable instructions for generating the reliability score based on the prior reliability score for the processing entity as weighted by a mathematical weighting indicating a decrease in relevance of the prior reliability score over time.

13. The computer-readable storage media of claim 11, wherein the processing job specifies requirements of the processing job; and wherein further the computer-readable storage media comprise further computer-executable instructions, which, when executed by the one or more processing units, cause the computing device to perform further steps comprising: deriving the minimum acceptable reliability score associated with the processing job based on the specified requirements of the processing job.

14. The computer-readable storage media of claim 11, comprising further computer-executable instructions, which, when executed by the one or more processing units, cause the computing device to perform steps comprising:

receiving updated reliability data associated with the processing entity;

generating an updated reliability score for the processing entity based at least in part on the received updated reliability data;

determining that a processing job previously scheduled on the processing entity, and still executing on the processing entity, is associated with a minimum acceptable reliability score that is higher than the updated reliability score of the processing entity; and rescheduling the processing job previously scheduled on the processing entity to a different processing entity, the different processing entity having a reliability score greater than or equal to the minimum acceptable reliability score associated with the job previously scheduled on the processing entity, the rescheduling resulting in execution of the processing job being moved from the processing entity to the different processing entity.

15. The one or more computer-readable storage media of claim 11, wherein the processing entity is a collection of individual computing devices, each individual computing device also having a reliability score; and wherein further the scheduling the received processing job on the processing entity comprises further scheduling the received processing job on a specific one of the individual computing devices based on its reliability score.

16. A system for executing processing jobs, the system comprising:

multiple collections of computing devices;

a first reliability-aware scheduler computing device performing steps comprising:

receiving real-time reliability data associated with a first collection of computing devices from among the multiple collections of computing devices;

generating a reliability score for the first collection of computing devices based on at least some of the received reliability data associated with the first collection of computing devices and based on a prior reliability score for the first collection of computing devices;

receiving a processing job for scheduling, the processing job having associated with it a minimum acceptable reliability score; and scheduling the received processing job on the first collection of computing devices only if the generated reliability score of the first collection of computing devices is greater than or equal to the minimum acceptable reliability score associated with the processing job; and a second reliability-aware scheduler computing device performing steps comprising:

receiving real-time reliability data associated with a first computing device in the first collection of computing devices;

generating a reliability score for the first computing device based on at least some of the received reliability data associated with the first computing device and based on a prior reliability score for the first computing device;

receiving, from the first reliability-aware scheduler computing device, the processing job for scheduling on a computing device of the first collection of computing devices; and scheduling the received processing job on the first computing device only if the generated reliability score of the first computing device is greater than or equal to the minimum acceptable reliability score associated with the processing job.

17. The system of claim 16, wherein the real-time reliability data associated with the first collection of computing devices comprises information regarding a factor that impacts all of the computing devices in the first collection of computing devices; and wherein further the real-time reliability data associated with the first computing device comprises information specific to the first computing device.

18. The system of claim 16, wherein the reliability score for the first collection of computing devices is based on the at least some of the received reliability data associated with the first collection of computing devices as processed by a mathematical function derived from a statistical reliability model correlating failure of the first collection of computing devices to factors quantified by the at least some of the received reliability data associated with the first collection of computing devices; and wherein further the reliability score for the first computing device is based on the at least some of the received reliability data associated with the first computing device as processed by a mathematical function derived from a statistical reliability model correlating failure of the first computing device to factors quantified by the at least some of the received reliability data associated with the first computing device.

19. The system of claim 16, wherein the reliability score for the first collection of computing devices is based on the prior reliability score of the first collection of computing devices as weighted by a mathematical weighting indicating a decrease in relevance of the prior reliability score of the first collection of computing devices over time; and wherein further the reliability score for the first computing device is based on the prior reliability score of the first computing device as weighted by a mathematical weighting indicating a decrease in relevance of the prior reliability score of the first computing device over time.

20. The system of claim 16, wherein the first reliability-aware scheduler computing device and the second reliability-aware scheduler computing device are a same computing device.

\* \* \* \* \*